United States Patent [19]

[11] 3,858,096

Kuhrt et al.

[45] Dec. 31, 1974

[54] CONTACT MEMBER FOR SEMICONDUCTOR DEVICE HAVING PRESSURE CONTACT

[75] Inventors: Friedrich Kuhrt; Horst Schreiner, both of Nurnberg, Germany

[73] Assignee: Siemens Aktiengesellschaft, Berlin and Munich, Germany

[22] Filed: Aug. 4, 1972

[21] Appl. No.: 277,925

Related U.S. Application Data

[63] Continuation of Ser. No. 871,748, Nov. 13, 1969, which is a continuation of Ser. No. 559,254, June 21, 1966, abandoned.

[30] Foreign Application Priority Data

June 22, 1965 Germany ................................ 97721

[52] U.S. Cl. ..........357/79, 317/234 A, 317/234 L, 317/234 G, 317/234 P

[51] Int. Cl. ............................ H014 3/00, H011 5/00

[58] Field of Search ............... 317/23 A, 6, 5, 52, 4, 317/1

[56] References Cited

UNITED STATES PATENTS

| | | | |
|---|---|---|---|
| 3,097,329 | 7/1963 | Siemens | 317/234 P |
| 3,293,508 | 12/1966 | Boyer | 317/234 P |
| 3,413,532 | 11/1968 | Boyer | 317/234 P |

*Primary Examiner*—Andrew J. James
*Attorney, Agent, or Firm*—Herbert L. Lerner

[57] ABSTRACT

A semiconductor device includes a semiconductor component having two electrodes, pressure means for maintaining pressure contact with the semiconductor component, a housing enclosing the semiconductor component, electrodes and pressure means in a gas-tight manner, electrical insulating means electrically insulating portions of the housing in thermal and electrical contact with one of the electrodes from the portion of the housing in thermal and electrical contact with the other electrode, the electrical and thermal contact under pressure with the portion of the housing unbonded and by pressure only, and a contact member positioned between each of the electrodes and the portion of the housing and held in electrical and thermal contact under pressure between the electrodes and the portion of the housing, the contact members comprising sintered material having good thermal and electrical conductivity characteristics and a porosity of 2 to 40 percent, and further characterized by the contact members having surfaces with an expansion coefficient different from the expansion coefficient of the surfaces of the electrodes in contact therewith to permit gliding of the contacting surfaces relative to one another.

2 Claims, 10 Drawing Figures

CONTACT MEMBER FOR SEMICONDUCTOR DEVICE HAVING PRESSURE CONTACT

This is a continuation, of application Ser. No. 871,748, filed Nov. 13, 1969 and now abandoned.

The present invention relates to a semiconductor device having a pressure contact. More particularly, the invention relates to a contact member for a semiconductor device having a pressure contact.

A semiconductor device having a pressure contact may comprise a junction rectifier, a junction transistor or a thyristor with areal p-n junction. In a pressure contact rectifier, for example, a silicon disc having a p-n junction is contacted under pressure by flat or substantially planar metal plates. The silicon disc is often alloyed on one surface with a molybdenum disc, by means of aluminum, and on the other surface with a gold disc, preferably comprising a gold-antimony alloy. The pressure contact surfaces on one side of the molybdenum disc such as, for example, silver, and on the other side of the silicon disc such as, for example, gold, and the metallic contact areas of the counter-contacts pressing against the same must satisfy very stringent requirements with respect to having small surface roughness. Conventional surface treatment processes, such as precision grinding and lapping, are time-consuming and relatively expensive during the production process.

The principal object of the present invention is to provide a new and useful contact member for a semiconductor device having a pressure contact. The contact member of the present invention provides a very small electrical and heat resistance between contact components between which it is placed and provides a perfect areal contact between such contact components.

In accordance with the present invention, a contact member comprises sintered porous material having high electrical and thermal conductivity characteristics placed between and in close contact with adjacent contact components of a pressure contact. The contact member has a porosity of between 2 and 40 percent and comprises a plastically deformable metal or metal alloy having a lubricating material distributed finely and uniformly therein. The contact member preferably comprises one of the group consisting of silver, copper, silver alloys and copper alloys.

The lubricating material distributed within the contact member preferably comprises one of the group consisting of graphite, molybdenum (IV)-sulphide and tungsten selenide. The contact member may comprise a disc having two layers, each comprising a metal or a metal alloy. A lubricating material may be distributed in one of the layers of the disc or in both layers of the disc. The metal or metal alloy of one of the layers may be different from the metal or metal alloy of the other of the layers.

In order that the present invention may be readily carried into effect, it will now be described with reference to the accompanying drawings, wherein.

Figures 1, 2, 3:
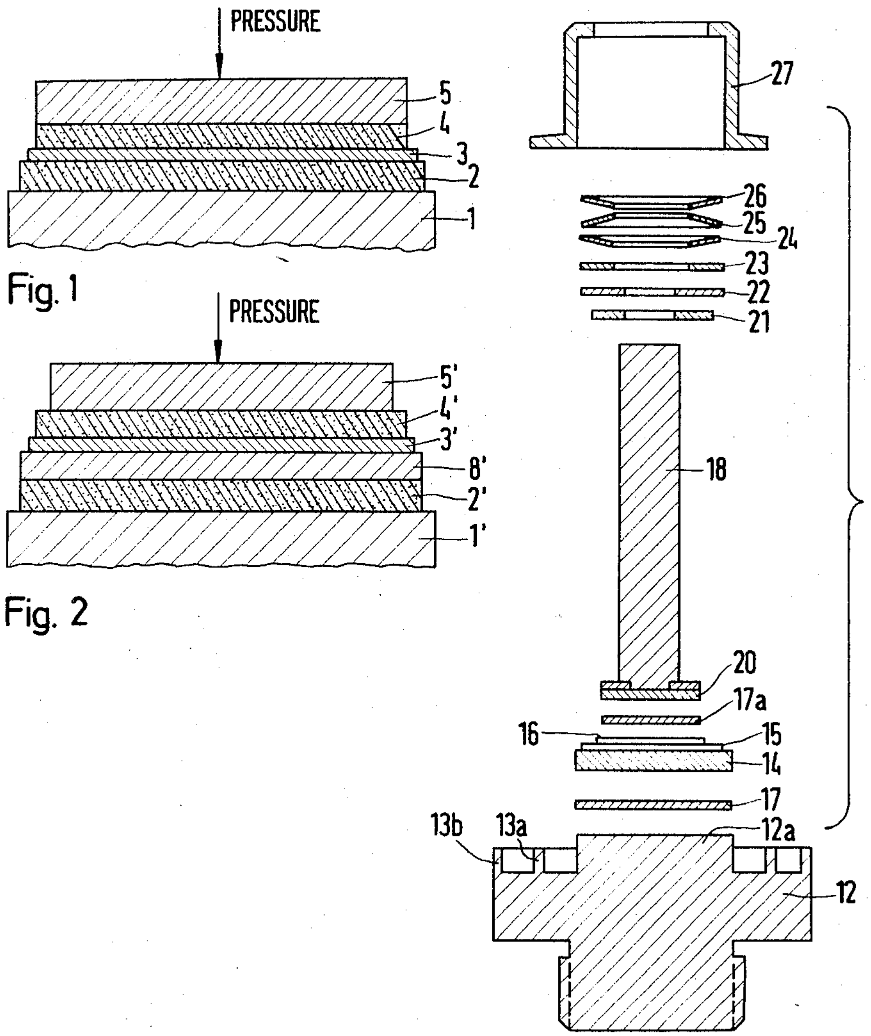
FIG. 1 is a sectional view of an embodiment of a semiconductor device having pressure contacts and illustrating the positioning of two contact members of the present invention.
FIG. 2 is a sectional view of a modification of the embodiment of FIG. 1 illustrating the positioning of two contact members of the present invention.
FIG. 3 is a sectional exploded view of another embodiment of a semiconductor device having pressure contacts and illustrating the positioning of two contact members of the present invention.

The contact member of the present invention may comprise a disc having a thickness of, for example, between 0.1 and 2.0 mm. The contact member may comprise pure silver, or pure copper, or silver or copper alloys, or cadmium alloys, or compound metals such as, for example, silver and nickel or silver and graphite, silver-molybdenum (IV)-sulphide or silver-tungsten selenide, copper-graphite, copper molybdenum (IV)-sulphide or copper-tungsten-selenide.

The lubricating material such as, for example, graphite, functions to facilitate the relative motion between the contacting areas of the pressure-biased contact member and the contact components. The relative motion occurs as a result of the variable thermal expansion of the contact member and contact components. The lubricating material also functions to prevent adhesion between the contacting member and contact components. The lubricating material, such as graphite or molybdenum (IV)-sulphide, added to the metal or metal alloy of the contact member is approximately 1 to 10 percent by weight.

The contact member of the present invention may comprise, for example, a sintered silver disc having two layers. One layer may consist of silver-graphite, the second layer of sintered pure silver. The contact member is produced by compression of the powdered silver and graphite particles, stacked on each other in a matrix, and then sintering the resultant compressed member.

The contact member of the present invention may comprise, for example a sintered disc having two layers. Each layer may comprise a metal or a metal having lubricating material distributed therein, or one layer may comprise a metal and the other layer may comprise a metal having a lubricating material distributed therein. Cost is a considered factor in producing the contact member. Thus, for example, a sintered pure silver disc may be replaced by a sintered disc having two layers. The disc may have a sintered copper portion of predominant thickness and an inside coating of pure silver.

A disc having two layers may be utilized as the contact member in view of the fact that the required total thickness of said contact member may be more economically produced by an appropriately thick sintered copper portion of a layer of said disc. Hence, the thickness of the sintered disc, for the purpose of obtaining a minimum overall thickness of the contact member may consist predominantly of cheap sintered copper material. This is not possible with a sintered disc of pure silver, relative to its technical characteristics and requirements.

If the contact member comprises a disc having two layers, one of said layers comprising a metal and the other of said layers further comprising a lubricating material distributed in the metal thereof, the one metal layer may comprise pure silver or pure copper, and the other metal and lubricating material layer may comprise silver-graphite, copper-graphite, silver-molybdenum (IV)-sulphide, copper-molybdenum (IV)-sulphide, or silver-tungsten selenium.

When the contact member or sintered silver disc and the contact components of the semiconductor device are maintained in contact under pressure, the lubricating material in the contact member prevents binding or adhesion between said contact member and contact components by facilitating sliding of the contacting surfaces or areas, on each other during the course of temperature variations in the semiconductor device. Thus, in accordance with the present invention, a single sintered porous metal disc, comprising a single contact member of the present intention, may be positioned at one contact surface of the semiconductor body of the semiconductor device only, or a contact member of the present invention may be positioned at each said contact surface, or a plurality of said contact members may be utilized at a plurality of different contact surfaces of the semiconductor device.

The sintering process for producing the contact member of the present invention and the material used for sintering should be so selected that, at the pressure utilized to maintain the pressure contact of the contact member and the contact components, a plastic forming or deformation of said contact member occurs. The plastic deformation of the contact member provides the closest to perfect or ideal uniform areal fit or contact of the contacting surfaces of said contact member and the contact components. The contacting surfaces of the contact components may be identified as the counter-contact areas or surfaces. The plastic deformation of the contact member also makes said contact member substantially pressure resistant.

Surface roughness of the contact member after sintering in production may be reduced by compression of the sintered disc or member between flat high surface quality surfaces of a press. After completion of the sintering process, the contact member may be further processed for shaping and volume. The contact member preferably comprises a disc of sintered pure silver. The geometric configuration of the contact member is determined by the contact components of the semiconductor device. The contact member may be round, square, hexagonal or the like in circumference.

The thickness of the contact member is between 0.1 and 2.0 mm and is preferably between 0.2 and 0.5 mm. The space filling degree of the sintered disc contact member is between 60 and 98 percent. Material and conditions are so selected that the space filling degree is not essentially reduced. The porosity of the contact member is between 2 and 40 percent, as hereinbefore indicated. The pores should be distributed homogenously in the contact member and should be as fine as possible. It is especially preferable to utilize as the contact member a sintered disc produced with fine, very loose metal powder particles such as, for example, electrolyte and reduction metal powder.

The porous sintered disc contact member of the present invention positioned between the contact areas of the contact components not only balances the uneveness between said contact areas under pressure contact, but also compensates for the effects of the different coefficients of expansion of said contact components. Silicon has a coefficient of expansion of $3.7 \times 10^{-6}$, whereas molybdenum has a coefficient of expansion of $5 \times 10^{-6}$, and copper has a coefficient of expansion of $16.5 \times 10^{-6}$.

To produce a porous sintered disc contact member of, for example, pure silver, it is preferable to densify electrolyte silver of grain size less than 60 micrometers in a steel matrix, at a pressure of 0.5 megapond per square centimeter. The compressed or pressed disc should have a diameter of, for example, 5 mm, a height of 0.31 mm and a weight of 0.0322 gram. In compressed condition, the density amounts to 5.30 g/cm$^3$ and the space filling degree in the same condition is 50.5 percent.

Sintering is at 700°C in a hydrogen atmosphere, for one hour. The linear sinter shrinkage is approximately 5 percent, the density of the sintered disc is 6.32 g/cm$^3$ and the space filling degree is 60.2 percent. Mixtures of electrolyte silver powder may be processed with copper, cadmium, graphite, molybdenum (IV)-sulphide or tungsen selenide powder.

The contact member of porous sintered metal of the present invention may be readily plastically formed or deformed. Under pressure, the metal contact surfaces or areas of the contact components are pressed into the contact surfaces or areas of the contact member at a pressure of less than one kilopond per square millimeter. The contact member thus provides excellent metal contact with very small electrical and thermal contact resistances. Temperature variations cause relative motions between contacting contact surfaces due to variable expansion coefficients of the contact components. The contact member is not adversely affected by temperature variations, due to its plastic and elastic forming characteristics.

A plurality of contact members of the present invention may be utilized in a single semiconductor device without adverse effect on any of said contact members. As many as ten contact members of the present invention have been utilized in a single semiconductor device without detectable differences in the contact resistance.

FIGS. 1, 2, 3, 4 and 5 illustrate pressure contact semiconductor rectifiers. In FIG. 1, only a portion 1 of a copper housing is shown, having an upper contact surface pressed against and in contact with the lower contact surface of a porous sintered disc contact member 2 of the present invention. The upper contact surface of the contact member is pressed against and in contact with the lower contact surface of a silicon disc or semiconductor body 3 which is doped on both sides and metallized at its surfaces. The upper contact surface of the silicon body 3 is pressed against and in contact with the lower contact surface of another porous sintered disc contact member 4. A contact plate 5 is positioned on the contact member 4. The aforementioned components and contact members are compressed in the housing by a spring such as, for example, a cup spring. The copper housing 1 functions as one terminal of the current supply and the contact plate 5 functions as the other terminal of the current supply. The contact member 2 provides electrical and thermal contact between the semiconductor body 3 and the housing 1 and the contact member 4 provides electrical and thermal contact between said semiconductor body and the contact plate 5.

FIG. 2 is the same as FIG. 1, except that a molybdenum disc 8 is included in FIG. 2 between the silicon body 3' and the contact member 2'. The molybdenum disc 8 is alloyed to the semiconductor body 3' by aluminum. Thus, in FIG. 2, the silicon and molybdenum discs 3' and 8 are positioned between the contact members 2' and 4' and the discs and contact members are compressed between the housing portion 1' and the contact plate 5'. The components of the semiconductor device are coaxially positioned or centered during production of said device, by any suitable means such as, for example, a ring of insulation material such as, for example, steatite, which is placed around them.

Figure 4:
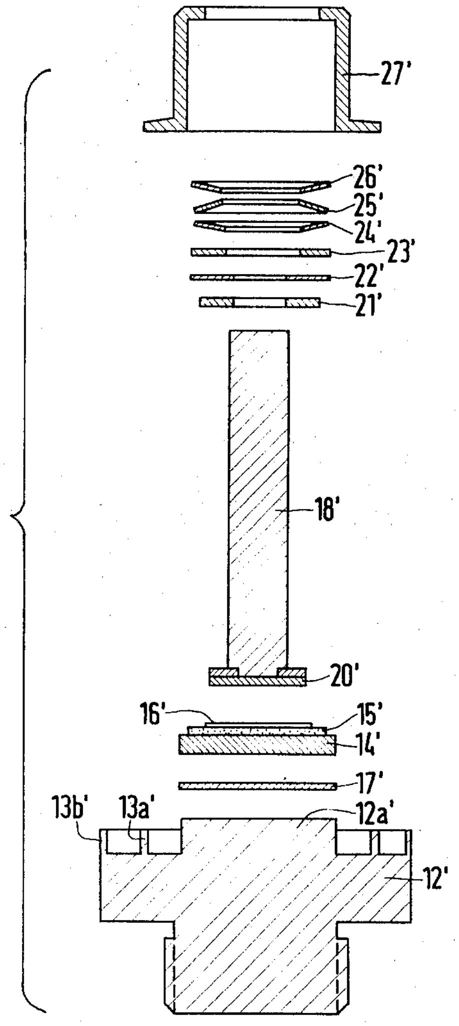
FIG. 4 is a sectional exploded view of a modification of the embodiment of FIG. 3 illustrating the positioning of one contact member of the present invention.
Figure 5:
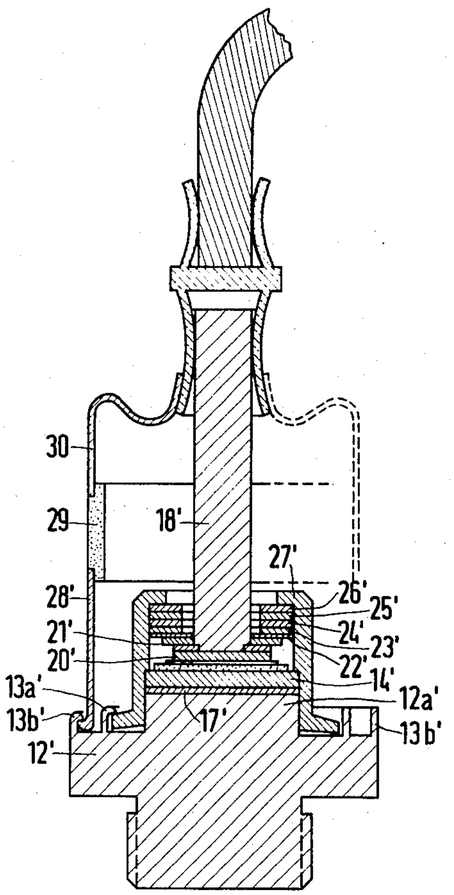
FIG. 5 is a sectional assembled view of the modification of FIG. 3.

The semiconductor device of FIGS. 3, 4 and 5 is encapsulated. The thickwalled bottom component 12 of FIGS. 3, 4 and 5 comprises good heat-conducting material such as, for example, copper. The bottom component 12 includes a raised base portion **12*a* formed therein. A porous sintered disc contact member 17 is positioned with its lower contact surface in contact with the upper contact surface of the base portion 12*a* and with its upper contact surface in contact with the lower contact surface of a molybdenum disc 14. A semiconductor body 15 of silicon is positioned with its lower contact surface in contact with the upper contact surface of the molybdenum disc 14. The molybdenum disc 14 is alloyed with the silicon disc 15 by an aluminum layer which is not shown. A gold-antimony foil 16 is alloyed with the upper contact surface of the silicon disc 15**.

In FIG. 3, but not in FIGS. 4 and 5, another porous sintered disc contact member **17*a* is positioned with its lower contact surface in contact with the upper contact surface of the gold-antimony foil 16. A copper supply contact 18 is positioned with the lower contact surface of its flange 20 in contact with the upper contact surface of the contact member 17*a* in FIG. 3 and in contact with the upper contact surface of the gold-antimony foil 16' in FIGS. 4 and 5. The flange 20 of the supply contact 18 includes a molybdenum disc which may be affixed to said supply contact by hard solder. A washer 21, an insulation washer 22, such as mica, for example, a steel washer 23 and three cup springs 24, 25 and 26 are coaxially positioned around and on the supply contact 18**.

The flange rings **13*a* and 13*b* of the bottom component 12 are utilized in the manner shown in FIG. 5 to affix an inner housing 27 for the springs 24, 25 and 26 and an outer housing to said bottom portion. The outer housing comprises individual parts 28, 29 and 30. The parts 28 and 30 comprise steel or an iron alloy and the part 29** comprises insulating material such as ceramic material.

In producing the semiconductor device of FIG. 3, the porous sintered disc contact member **17*a* may be pressed on the molybdenum disc 20** and then sintered.

Figure 6:
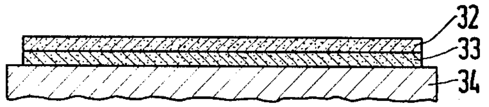
FIG. 6 is a sectional view of an embodiment of a two-layer contact member of the present invention and a contact component of a semiconductor device.

FIG. 6 is an embodiment of a sintered disc contact members having two layers. The sintered disc contact member of FIG. 6 comprises a silver-graphite layer 32 and a pure silver layer 33. The layers 32 and 33 are positioned on a contact component 34 of a semiconductor device.

Figure 7:
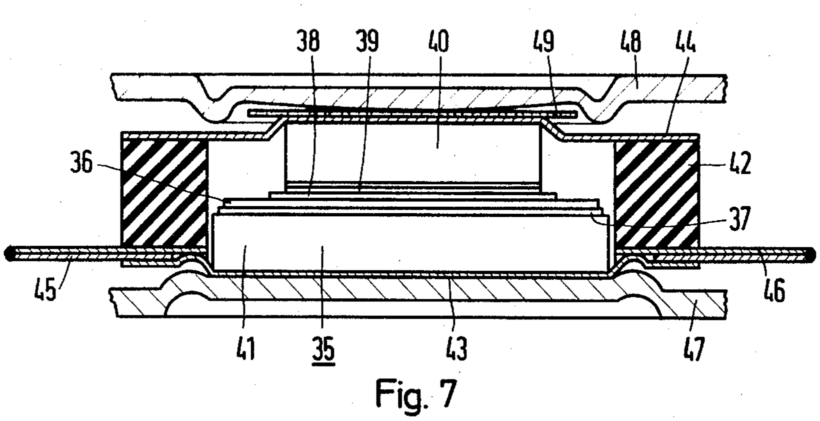
FIG. 7 is a view, partly in section, of still another embodiment of a semiconductor device having pressure contacts and illustrating the positioning of a contact member of the present invention.

The semiconductor device of FIGS. 7, 8, 9 and 10 is a disc-shaped rectifier cell. In FIG. 7, a semiconductor unit 35 is enclosed, gas-tight, in a housing. The semiconductor unit 35 comprises a silicon plate 36 of weakly doped electrical conductance type. An aluminum electrode 37 is alloyed with the lower contact surface of the silicon plate 36 and a gold-antimony electrode 38 is alloyed with the upper contact surface of said silicon plate. The electrodes 37 and 38 provide within the semiconductor body the required doped regions for the formation of a p-n junction and for the diode structure. A silver plate 39 is positioned on the upper surface of the gold-antimony electrode 38 and a molybdenum plate 40 is positioned on said silver plate affixed to it by a layer of hard solder. The silicon plate 36 is affixed, for example, by solder, to a molybdenum plate 41, via an aluminum layer 37.

The semiconductor unit is enclosed in a gas-tight housing comprising an insulation ring 42, for example, of ceramic material. The upper and lower annular contact surfaces of the insulation ring 42 are metallized. A stepped disc type cover plate 44 of ductile material such as, for example, silver, is soldered to the upper annular contact surface of the insulation ring 42. An annular member 45 is soldered to the lower annular contact surface of the insulation ring 42. A stepped disc type cover plate 43 of ductile material such as, for example, silver, closes or seals off the bottom of the housing.

The cover plate 43 is first soldered to an annular plate 46 which is then affixed in gas-tight manner at its outer rim to the lower annular contact surface of the annular member 45. The annular plate 46 may be affixed to the annular member 45 by any suitable means such as, for example, gas welding. The shapes of the cover plates 43 and 44 are so designed that they provide for a position orientation of the semiconductor unit 35 in the housing. This is due to the fact that the semiconductor unit 35 is seated with the upper contact surface of the molybdenum plate 40 in contact with the lower contact surface of the indented portion of the cover plate 44 and with the lower contact surface of the molybdenum plate 41 in contact with the upper contact surface of the indented portion of the cover plate 43. The inner circular edge of the indented portion of each of the cover plates 43 and 44 thereby centers the semiconductor unit 35 in position in the housing.

A pressure plate 47 which also functions as a cooling body, contacts the lower contact surface of the cover plate 43 and may also function as the electrical terminal conductor of the semiconductor unit 35. The upper surface of the pressure plate 47 is so designed, with an annular protrusion, that it centers itself via said annular protrusion relative to the cover plate 43 of the housing.

A pressure plate 48, which also functions as a cooling body, contacts the upper contact surface of a porous sintered plate contact member 49. The contact member 49 is positioned with its lower contact surface in contact with the upper contact surface of the cover plate 44. The pressure plate 48 is so shaped that it bulges in its central area, in the direction of the semiconductor unit 35 so that it may be adjusted somewhat flexibly in this area, relative to the porous sintered plate contact member 49. The bulging area of the pressure plate 48 is readily pressed into the upper surface of the contact member 49 and simultaneously provides good area contact between the lower surface of said contact member 49 and the upper contact surface of the cover plate 44.

Figure 8:
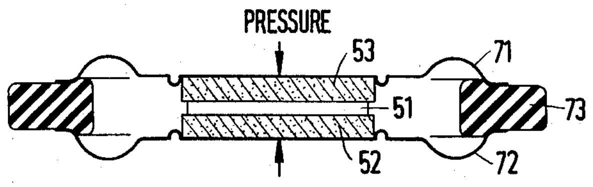
FIG. 8 is a partly sectional view of a modification of the embodiment of FIG. 7 illustrating the positioning of two contact members of the present invention.

In FIG. 8, a silicon disc 51, doped on both sides, is positioned between two porous sintered disc contact members 52 and 53. In the embodiment of FIG. 8, a semiconductor device of the type of FIG. 1 is housed in a pressure contact disc cell comprising two metal membranes 71 and 72 and an annular ring 73 of insulation material.

Figure 9:
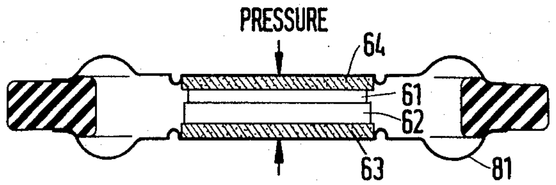
FIG. 9 is a partly sectional view of a modification of the modification of FIG. 8 illustrating the positioning of two contact members of the present invention.

FIG. 9 utilizes a semiconductor device of the type of FIG. 2 in a pressure contact disc cell. A silicon disc 61 is alloyed at its lower surface via aluminum with a molybdenum disc 62 and is alloyed at its upper surface with gold-antimony foil. The silicon and molybdenum discs 61 and 62 are positioned in the disc cell between two porous sintered disc contact members 63 and 64. In a modification of the embodiment of FIG. 9, instead of the two contact members 63 and 64, a single contact member such as, for example, the contact member 63, may be utilized. The contact member 63 is positioned between the molybdenum disc 63 and the metal membrane 81.

Figure 10:
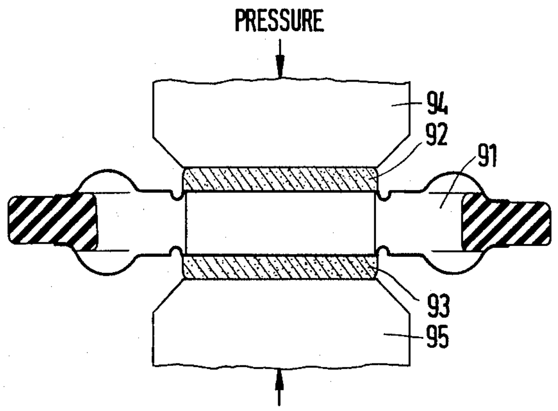
FIG. 10 is a partly sectional view of another modification of the modification of FIG. 8 illustrating the positioning of two contact members of the present invention.

The porous sintered disc contact members of the present invention may be utilized inside pressure contact semiconductor devices, as hereinbefore illustrated, to provide good heat and electrical conductivity or transfer. The contact members of the present invention may also be utilized outside a semiconductor device to provide good heat conductivity to a cooling body. In FIG. 10, a pressure contact disc cell 91 is clamped, or held in position under pressure, between two porous sintered disc contact members 92 and 93. The upper contact surface of the contact member 92 is contacted by the lower contact surface of a cooling body 94 and the lower contact surface of the contact member 93 is contacted by the upper contact surface of a cooling body 95.

While the invention has been described by means of specific examples and in specific embodiments, we do not not wish to be limited thereto, for obvious modifications will occur to those skilled in the art without departing from the spirit and scope of the invention.

We claim:

1. A semiconductor device comprising a semiconductor component having two electrodes; pressure means for maintaining said electrodes in pressure contact with said semiconductor component; a housing enclosing said semiconductor component, said electrodes and said pressure means in gas-tight manner, said housing having portions with good thermal electrical conducting characteristics and said pressure means pressing said semiconductor component and said electrodes to portions of said housing; electrical insulating means electrically insulating the portions of the housing which are in thermal and electrical contact with one of said electrodes from the portion of said housing which is in thermal and electrical contact with the other of said electrodes whereby at least one of said electrodes is held in electrical and thermal contact under pressure with the respective portion of said housing unbonded and by pressure only; and a contact member positioned between said one of said electrodes and said portion of said housing and held in electrical and thermal contact under pressure between said one of said electrodes and said portion of said housing, said contact member comprising sintered material having good thermal and electrical conductivity characteristics and a porosity of 2 to 40 percent, said contact member comprising lubricating material selected from the group consisting of graphite, molybdenum (IV) sulphide and tungsten selenide.

2. A semiconductor device comprising a semiconductor component having two electrodes; pressure means for maintaining said electrodes in pressure contact with said semiconductor component; a housing enclosing said semiconductor component, said electrodes and said pressure means in gas-tight manner, said housing having portions with good thermal electrical conducting characteristics and said pressure means pressing said semiconductor component and said electrodes to portions of said housing; electrical insulating means electrically insulating the portions of the housing which are in thermal and electrical contact with one of said electrodes from the portion of said housing which is in thermal and electrical contact with the other of said electrodes whereby at least one of said electrodes is held in electrical and thermal contact under pressure with the respective portion of said housing unbonded and by pressure only; and a contact member positioned between said one of said electrodes and said portion of said housing and held in electrical and thermal contact under pressure between said one of said electrodes and said portion of said housing, said contact member comprising sintered material having good thermal and electrical conductivity characteristics and a porosity of 2 to 40 percent, said contact member comprising a sintered disc having two layers, one of which comprises a lubricating material of the group consisting of graphite, molybdenum (IV) sulphide and tungsten selenide.

* * * * *